US 7,606,595 B2

(12) United States Patent
Srinivasan et al.

(10) Patent No.: US 7,606,595 B2
(45) Date of Patent: Oct. 20, 2009

(54) INTERNET PROTOCOL MULTIMEDIA SUBSYSTEM ENABLED CELLULAR PHONE ACCESSORY DEVICE

(76) Inventors: Sudharshan Srinivasan, 5496 Golubin Common, Fremont, CA (US) 94555; Jai Kumar, 20360 Clifden Way, Cupertino, CA (US) 95014; Kothandraman Ramchandran, 45426 Potawatami Dr., Fremont, CA (US) 94539

( * ) Notice: Subject to any disclaimer, the term of this patent is extended or adjusted under 35 U.S.C. 154(b) by 496 days.

(21) Appl. No.: 11/583,756

(22) Filed: Oct. 18, 2006

(65) Prior Publication Data
US 2007/0093264 A1 Apr. 26, 2007

Related U.S. Application Data

(60) Provisional application No. 60/728,884, filed on Oct. 20, 2005.

(51) Int. Cl.
*H04M 1/00* (2006.01)

(52) U.S. Cl. ............... 455/556.1; 455/552.1; 455/557; 455/569.1; 455/550.1; 370/352; 348/14.02

(58) Field of Classification Search ............ 455/556.1, 455/552.1, 557, 569, 550, 569.1, 550.1; 370/352; 348/14.02
See application file for complete search history.

(56) References Cited

U.S. PATENT DOCUMENTS 7,251,500 B2 * 7/2007 Nakagawa et al. ........ 455/556.1

* cited by examiner

*Primary Examiner*—Sanh D Phu

(57) ABSTRACT

A cellular phone accessory device (47) combined with an IMS client (31) is implemented to provide real time interactive multimedia applications to low end phones (36) and middle range phones (40) without having to re-engineer said phones. Said device behaves as a cellular phone accessory and IMS client that is implemented using client control, protocol components (32) and IMS client media components (33). Said device comprises of general purpose processor (34) and digital signal processor (35) connected using a DSP bridge (46).

14 Claims, 7 Drawing Sheets

INTERNET PROTOCOL MULTIMEDIA SUBSYSTEM ENABLED CELLULAR PHONE ACCESSORY DEVICE

CROSS REFERENCE TO RELATED APPLICATIONS

This is the utility patent of provisional Patent Application U.S. 60/728,884 with a priority date of Oct. 20, 2005.

FIELD OF INVENTION

The present invention generally relates to internet protocol (IP) cellular phone accessory devices and specifically to IP multimedia subsystem (IMS) enabled cellular phone accessory device to enable mass deployment of IP multimedia services in a cellular network.

BACKGROUND OF THE INVENTION—PRIOR ART

Cellular phone accessory market is a well established market with several kinds of accessories available to enhance user experience. Accessories can be wired or wireless or available as attachments. Some examples of commonly available accessories are headset, keyboard, speakerphone, camera and display. A cellular phone accessory is defined to be a device that is controlled by the cellular phone and either extends or partitions existing functionality into an easy to use device. This implies that there exist a master slave relationship between a cellular phone and an accessory wherein cellular phone is master and accessory is slave.

In some situations a cellular phone gets used as a slave and other devices such as a personal computer (PC) control the cellular phone. In these cases the master slave relationship is reversed and a cellular phone gets used as a slave and serves as a data modem. In this setup where a cellular phone is used as a data modem, cellular phone is termed as mobile termination equipment (MT) and personal computer that controls cellular phone is termed as terminal equipment (TE).

This MT/TE relation enables any data oriented service to be available to a user using a cellular network since a cellular phone acts as a cellular gateway to internet protocol network. In particular real time interactive applications using internet protocol multimedia subsystem (IMS) can also be supported.

Thus it is to be noted that a cellular phone accessory extends existing cellular phone functionality in hardware, whereas a cellular phone used as a data modem extends functionality in software with new IMS applications that can be executed on terminal equipment. A software functionality extension using MT/TE relation serves cellular phones that do not have ability to run new software, whereas a cellular phone accessory device serves cellular phones with limited hardware features. So both relations serve a useful purpose, but each is offered as a different device combination. That is, to have extended hardware functionality and extended software functionality, a person would have to carry a cellular phone, a cellular phone accessory device and terminal equipment resulting in a total of three devices.

Hence a user would have to carry three devices if there is a need for both hardware and software functionality extension, which is not a preferable solution by most users.

To alleviate this problem, that a user would have to carry three devices, a cellular phone that is programmable could be used instead of a non-programmable cellular phone. Such programmable phones exist in market but are available in very low volume and very expensive compared to low end and middle range phones. This is due to the fact that low end and middle range phones use application specific integrated circuits to reduce power usage and bill of materials whereas completely programmable phones have to offer sophisticated operating systems and corresponding extended set of bill of materials.

Cellular phones are categorized into low end, middle range and high end phones also called smart phones. Only high end phones support general purpose programmability. General purpose programmability provides a programmable platform to support both real time interactive and non-interactive multimedia applications. There are several design challenges to provide complete general purpose programmability even in high end programmable smart phones. A list of challenges is given below.

a) Smart phone market is fragmented with different programming environments, or operating systems, and hence making it difficult for application vendors to produce mass market solutions reusable in a wide range of smart phones.

b) Smart phones are designed with several different chipsets, architectures and corresponding interfaces making it difficult for software solutions to expect similar functionality on different brands of smart phones.

c) Smart phone market is extremely low volume in comparison to low end and middle range phones. Smart phone market is currently estimated to be less than six percent of overall global cellular phone market place. Hence there are minimal development tools available as compared with tools that are available to develop applications for a personal computer.

d) Smart phones usually consume more power due to general purpose processor executing several millions of instructions in software.

e) Smart phones require more memory than conventional low end and middle range phones.

f) Due to the number of extra components, smart phones are usually bigger and heavier thereby affecting the usability of a cellular phone dramatically.

g) Interactive multimedia applications are difficult to program due to nonstandard interfaces to digital signal processing (DSP) unit.

Hence it can be seen that offering new functionality through smart phones although technically feasible, is not a viable business solution due to its low volume and fragmented programming environment.

For high volume, it is necessary that a solution that offers both hardware and software extension work with low and middle range phones.

Low end phones are not programmable and middle range phones offer minimal programmability with downloadable software using Sun Microsystems Java 2 Micro Edition (J2ME) or Qualcomm BREW environments. In particular IMS applications require interfaces to digital signal processing unit to get access to encoded multimedia bits. This is not provided in either low end or middle range phones.

Thus neither smart phone solutions nor a low end or middle range phone solutions can offer extended set of hardware and software functionality without compromising the business case of leveraging high volumes of low end and middle range phones.

Hence it can be seen that a device that can offer hardware extension as a cellular phone accessory device and software extension for real time interactive multimedia programmability will solve the above mentioned three device problem while leveraging mass market penetration of low and middle range phones.

This device of present invention is a combination of a cellular phone accessory functionality and terminal equipment programmability to support real time interactive multimedia applications. A device that is a cellular phone accessory provides hardware extension, and a device that behaves as a TE is also programmable. Hence such a combination of a cellular phone accessory and terminal equipment would solve both problems including lack of real time interactive multimedia programmability of low to middle range phones and limited market penetration of smart phones.

The combination device is achieved by incorporating real time interactive multimedia functionality as described in internet IMS specifications from standards body third generation partnership project (3GPP) into a cellular phone accessory device. IMS specifications prescribe an IMS client and an IMS server that interoperate to provide real time interactive multimedia applications. Hence a device that is both a cellular phone accessory and an IMS client will enable new real time interactive multimedia applications while working with low end and middle range phones. This device shall be referred to as IMS accessory device henceforth.

IMS accessory device is unique and is not known to exist in prior art. This will become very evident by the following description about prior art.

The prior art description is structured as follows: first functional description of prior art IMS client is covered; second functional description of cellular phones and challenges in enabling real time interactive multimedia services in cellular phones are described; finally the inadequacy of existing solutions for enabling real time interactive multimedia services on low end and middle range phones is described.

FIG. 1 shows the prior art IMS client 31, which is grouped into two functional components, namely IMS client control and protocol components 32 (or IMS control) and IMS client media components 33 (or IMS media). IMS control 32 is typically hosted by general purpose processor (GPP) 34 and IMS media 33 is hosted by digital signal processor (DSP) 35.

FIG. 2 shows a prior art low end phone 36 functional architecture.

There are several issues to resolve before IMS services can be made available on low end phone 36.

a) Processing power and memory issue on microcontroller unit (MCU): There may not be enough processing power and memory available for hosting IMS control 32 in low end phone microcontroller unit 37.

b) Processing power and memory issue on DSP: Low end cellular phones 36 may not have enough processing power available in digital baseband DSP 38 to simultaneously run two and half generation cellular packet switching protocol stack such as general packet radio service (GPRS) and vocoder. This is mandatory to support real time interactive multimedia services.

c) Streaming Vocoder access: MCU DSP link 39 is limited to exchanging data that is non-real time like phone call control signaling, wireless application protocol (WAP) data and hence real time stream support for voice is not available. Streaming vocoder access is mandatory to support real time interactive multimedia services.

d) Porting issue: In low end phones 36, MCU 37 runs proprietary embedded operating systems. Hardware and operating systems differences introduces several challenges, such as sixteen bit versus thirty two bit architecture, little-endian versus big-endian, availability of complete transport control protocol/internet protocol (TCP/IP) stack, access to persistence storage, lack of uniform memory management policies, nonuniform support for programming language like C or C++ for example runtime C libraries, string libraries, suitable application programming interface (API) to audio layer or vocoder layer, lack of uniform APIs for power management layer, APIs for networking connection management, lack of uniform APIs for window system management, lack of uniform APIs address book and recent call list. These challenges significantly increase the cost and time for building IMS services on low end cellular phones 36.

FIG. 3 shows functional architecture of middle range phone 40. Except for few differences like additional multimedia coprocessor 41, middle range phone 40 shares several identical components with 36 and also shares all the limitations of low end phones 36 described above as far as supporting real time interactive multimedia services. It is important to note that even with addition of multimedia coprocessor 41, multimedia data flow 42 does not support real time streaming which is needed for supporting real time interactive multimedia services.

FIG. 4 shows the functional architecture for high end phone 43. The general purpose processor (GPP) 44 and multimedia coprocessor 45 have higher processing power than its middle range phone 40 counter parts. GPP GPP-DSP bridge or DSP bridge 46 provides high performance streaming support for multimedia data and hence multimedia flow 42 supports real time multimedia streaming. Due to these differences, high end phones 43 can support real time interactive multimedia services.

One way to overcome the limitations described for low end phones 36 and middle range phones 40, is to build new features and functionality into cellular phone accessory that can interoperate with low end phones 36 and middle range phones 40. These accessories themselves can add features requiring no changes to major changes to software and/or hardware components in the cellular phones. Hence an ideal IMS accessory should provide IMS client 31 functionality without calling for any changes to software and hardware components in the cellular phones in order to interoperate with widest range of low end phones 36 and middle range phones 40.

US Doc 20020068600 proposes a mobile video phone system comprising a mobile telephone device, wearable radio communication device with display and an optional radio headset. It primarily addresses the ease of use issue of video telephony. The mobile telephone device co-ordinates the exchange of images/video between remote user and wearable radio communication device with display. Also, the mobile telephone device co-ordinates the exchange of voice between remote user and radio headset. This system does not provide IMS client functionality and hence does not support real time interactive IP multimedia services and additionally this system calls for moderate to significant software changes in the mobile telephone device.

U.S. Pat. No. 6,768,911 proposes a mobile communication terminal device consisting of mobile communication device with detachable display and ear phone component. The communication device and the components communicate using short-distance radio technology bluetooth. This prior art primarily addresses the size and portability of the device while maintaining rich functionality. This system does not provide IMS client functionality and hence does not support real time interactive multimedia services and additionally does not provide interoperability with existing low end and middle range phones.

U.S. Pat. No. 6,731,951 shows a cellular device having two parts, one having cellular communication support and bluetooth link, that can be stored away or used as a modem with PC or can work with the second component which is having input and output device (display, keyboard), camera and a bluetooth link. Obvious advantage being that the second device is small, easy to carry, small size battery and first unit being not close to the body, better signal strength for cellular connection and hence better battery life. This system does not provide IMS client functionality and hence does not support real time interactive multimedia services. Also the system calls for significant hardware and software changes to existing phones to interoperate.

U.S. Pat. No. 5,590,417 proposes a detachable headset device as an accessory to a cellular phone. The detachable headset when attached to phone can function as a speaker and microphone. The headset can also be detached and placed on the head of the user. In this mode of operation, the headset and the cellular phone communicate using low power RF transceivers. This system does not provide IMS client functionality and hence does not support real time interactive multimedia services.

U.S. Pat. No. 6,788,332 introduces a digital camera with wireless link that can operate with Personal digital assistant (PDA) or cellular phone to communicate with images or facsimiles to a remote user by setting by data call. This system does not offer real time interactive multimedia services.

Some prior art systems provide additional features and services by using PC and PDA as TE programmed with new functionality and simply treating the cellular phone as modem or MT. These systems implement IMS client functionality by splitting the implementation between cellular phone or MT and PC and PDA or TE. For interoperability with widest range of low end and middle range phones, the functional split should call for no changes in cellular phone or MT. Additionally, the ideal solution will implement IMS client functionality as a TE and also function as an accessory such as hands free phone or headset or viewer to the cellular phone for at most convenience to the end user.

US Doc 20030210678 proposes a method for connecting TE to IMS server using a cellular phone as MT. This method calls for functional split in implementing IMS client functionality between TE and MT. As per the method proposed in this prior art, terminal equipment performs protocol stream functions including real time transport protocol (RTP) and real time transport control protocol (RTCP) functions. The MT performs IMS proxy functions such as identification or authentication functions, as well as call control functions. Implementing IMS proxy function in mobile terminal limits the terminal equipment interoperability to selected mobile terminals that support IMS proxy function. Additionally, this solution does not combine terminal equipment function with cellular phone accessory function for end user convenience.

U.S. Pat. No. 6,788,676 proposes user equipment that includes a MT coupled to a TE. The TE includes IMS proxy adjunct which implements extensions needed in session initiation protocol (SIP) and session description protocol (SDP) for connectivity to IMS server. The user agent (UA) running on TE uses IMS proxy adjunct for accessing IMS services. Additionally, IMS proxy adjunct also implements support for quality of service (QoS) between TE and MT and also between TE and IMS server. This prior art primarily addresses the need of terminal equipment with regular SIP UA to communicate with IMS server through IMS proxy adjunct and this scheme is more suited for IMS enabling existing PC or PDA based regular SIP applications. Hence this prior art does not address a solution that implements IMS client functions as a cellular phone accessory. Also, this prior art does not address the issue of enabling IMS services to work with low end and middle range cellular phones.

As can be seen from above, no known prior art shows a device that is both a cellular phone accessory and an IMS client to deliver new real time interactive multimedia applications to mass market without said re-engineering efforts.

BACKGROUND OF THE INVENTION—OBJECTS AND ADVANTAGES

Accordingly, several objects and advantages of the present invention are:

a) to provide a cellular phone accessory device that enables delivering new real time interactive applications to low end and middle range cellular phones.

b) to deliver new real time interactive multimedia applications without having to re-engineer chipsets and architectures in low end and middle range phones.

c) to provide a single programming environment for new real time interactive multimedia applications development to eliminate portability problems that arise due to fragmented programming environment in cellular phones.

d) to provide access to digital signal processing functionality in said accessory device to enable real time interactive multimedia applications that would otherwise require expensive chipset and architecture upgrades.

e) to deliver new real time interactive multimedia applications in a small form factor without impacting size and battery requirements of low end and middle range cellular phones.

SUMMARY

In accordance with present invention a cellular phone accessory device combined with an IMS client is implemented to address said issues that prevent delivery of new real time interactive multimedia applications to low end and middle range phones.

Real-time interactive multimedia applications require special chipset architectures and access to digital signal processing unit. These are usually not available in low end and middle range cellular phones since cellular phone designs are aligned with chipset configurations. Chipset configurations for cellular phones are cost optimized for low, middle and high end phones. Currently real time interactive multimedia applications can only be supported on high end chipsets and corresponding high end phones.

But high end phone market is fragmented and low in volume shipments as compared with low end and middle range phones. This brings out a serious challenge of delivering new real time interactive multimedia applications to low end and middle range phones.

Real-time interactive multimedia applications platform is standardized by 3GPP as IMS client and server. In order to deliver real time interactive multimedia applications an IMS client has to be either implemented in the cellular phone or has to be provided as an external functionality. Implementing IMS client in a low end or middle range cellular phone suffers from the same issues of portability, chipset architecture differences and DSP access problems. Implementing IMS client as terminal equipment such as a PC or a PDA to provide real time interactive multimedia applications is impractical in terms of size, usability and cost.

On the other hand, a cellular phone accessory is comparatively smaller in size and cost effective to enable a user to carry it along with cellular phone. But all current known cellular phone accessories are limited in functionality and provide minimal programmability and hence cannot support full fledged real time interactive multimedia applications.

Hence it can be seen that there is a need for a system that strikes a balance between real time interactive multimedia programmability, portability, usability, cost and mass market appeal to enable new real time interactive multimedia applications to be deployed with low and middle range phones.

Such a system is achieved by a unique new device that is a combination of an IMS client with supporting chipset architecture, DSP access, and form factor and functionality of a cellular phone accessory. This device is referred to as IMS accessory device.

IMS accessory device provides an unobvious result of enabling new real time interactive multimedia applications to mass market low end and middle range phones striking a fine balance between real time interactive multimedia programmability, portability, usability, cost and mass market appeal.

DRAWINGS—FIGURES

Figure 1:
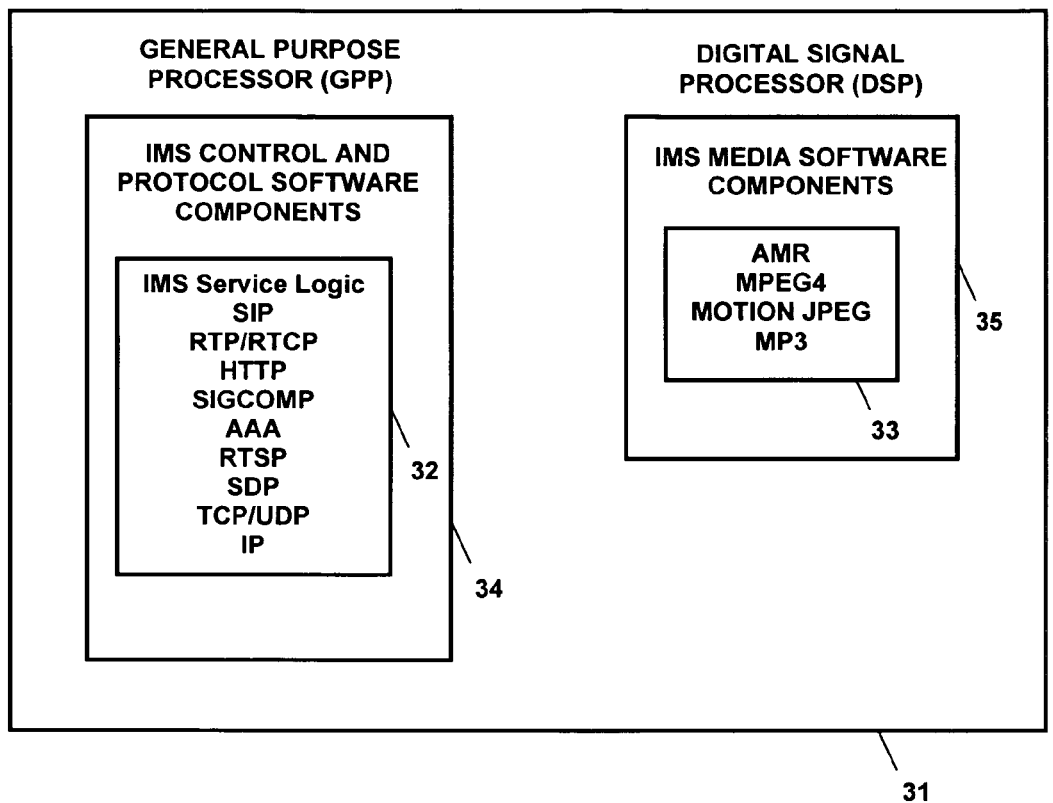
FIG. 1 shows the prior art IMS client which is grouped into two functional components namely IMS client control and protocol components and client media components.

DRAWINGS—REFERENCE NUMERALS 31 prior art IMS client
32 IMS client control and protocol components
33 IMS client media components
34 general purpose processor (GPP)
35 digital signal processor (DSP)
36 low end phone
37 low end phone microcontroller unit
38 digital baseband DSP
39 MCU DSP link
40 middle range phone
41 multimedia coprocessor
42 multimedia data flow
43 high end phone
44 general purpose processor (GPP)
45 multimedia coprocessor
46 GPP-DSP bridge or DSP bridge
47 IMS accessory
48 general purpose processor
49 digital signal processor
50 bluetooth transceiver
51 read only memory (ROM)
52 random access memory (RAM)
53 keypad
54 display
55 camera
56 microphone
57 speaker
58 analog-to-digital converter
59 bluetooth-host
60 physical connections
61 terminal equipment
62 mobile termination cellular phone
63 Personal computer (PC)
64 Personal digital assistant (PDA)
65 cellular phone
66 headset accessory
67 speaker accessory
68 camera accessory
69 display accessory
70 keypad accessory
71 IMS headset accessory
72 IMS keypad accessory
73 IMS speaker accessory
74 IMS camera accessory
75 IMS badge accessory
76 button accessory
77 analog baseband
78 radio frequency transceiver
79 antenna
80 voice flow
81 microcontroller unit MCU
82 flash

DETAILED DESCRIPTION OF PREFERRED EMBODIMENT

Figure 5:
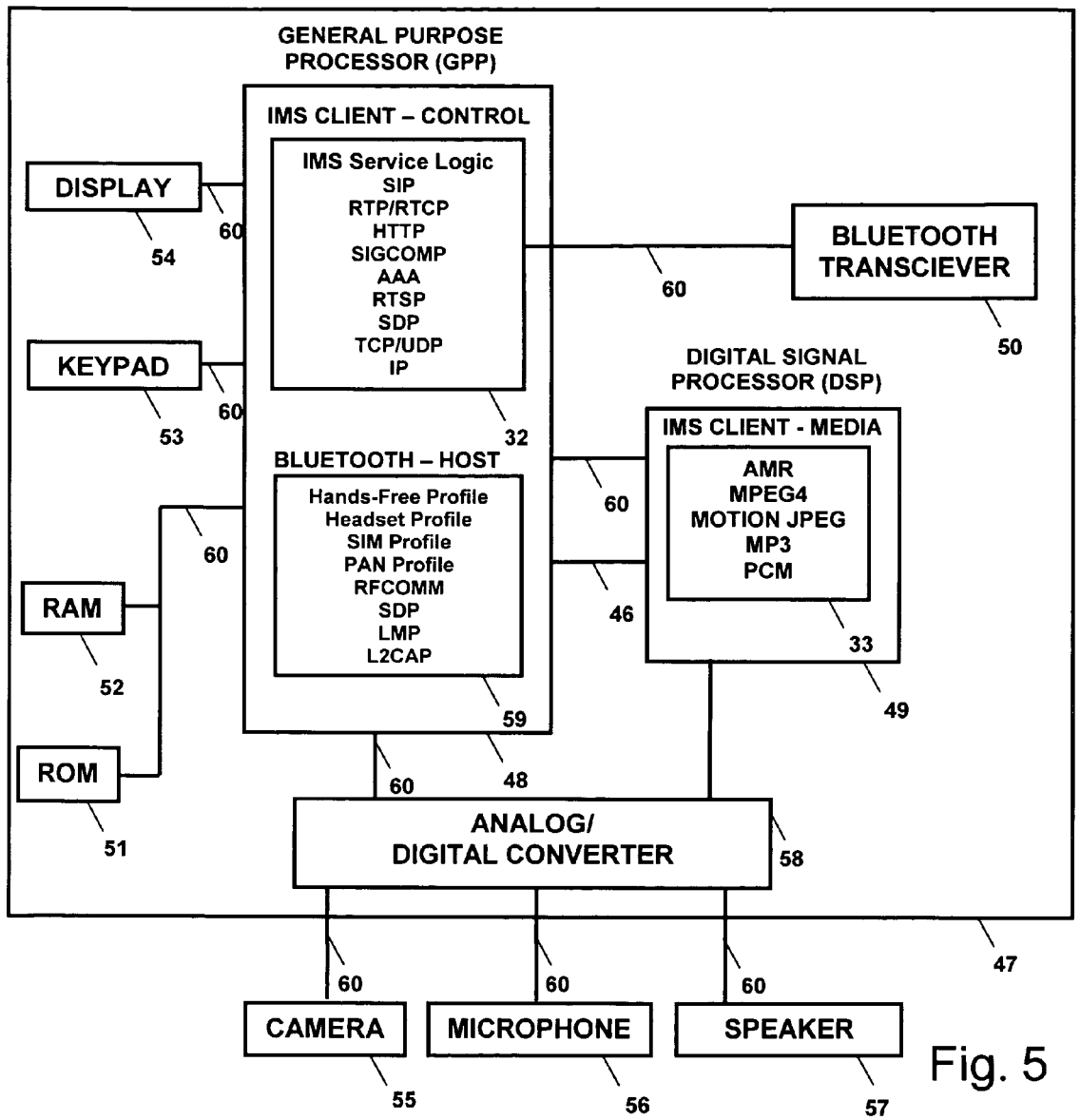
FIG. 5 shows the invention IMS accessory device which is a multifunction device where it functions as multimedia capable device supporting IMS based services and also functions as cellular phone accessory.
Figure 6:
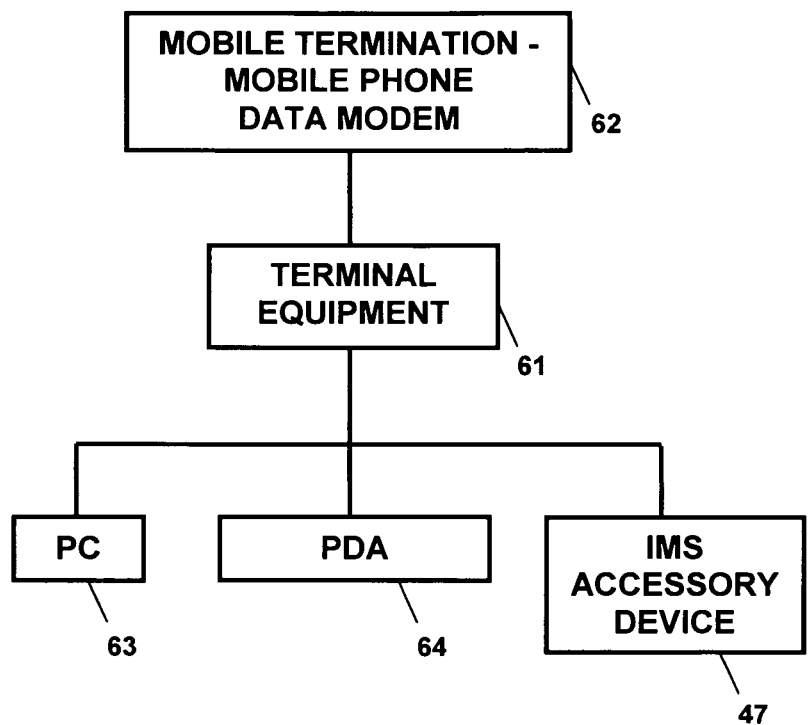
FIG. 6 shows the connection between the terminal equipment and the mobile termination cellular phone acting as a data modem.
Figure 7:
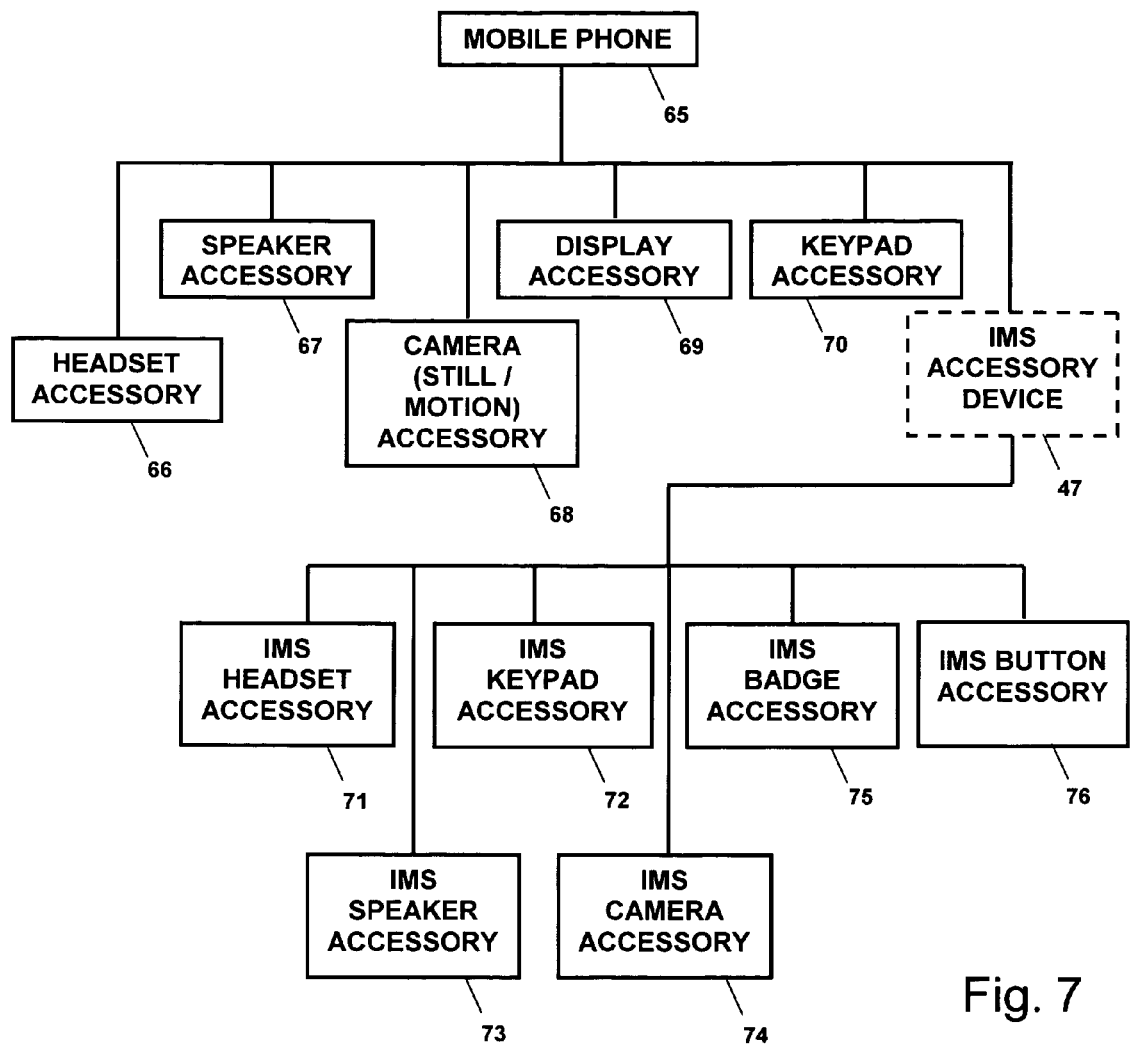
FIG. 7 shows the various accessories available for cellular phone to provide added functionality.

This section first covers an overview of the invention as shown in FIG. 5. It is then followed by description of how this invention fits in with various cellular phone accessory configurations as shown in FIG. 6 and FIG. 7. Finally, the invention as shown in FIG. 5 is described in detail.

FIG. 5 shows the invention IMS accessory device or simply called IMS accessory 47 which is a multifunction device where it functions as multimedia capable device supporting IMS based services and also functions as cellular phone accessory. Hence IMS accessory 47 has necessary hardware interfaces, processing power and memory to support both of these functionalities. IMS accessory 47 consists of general purpose processor 48, digital signal processor 49 and bluetooth transceiver 50. GPP 48 is connected to read only memory (ROM) 51 for program storage, random access memory (RAM) 52 for data storage and is also connected to standard peripheral devices such as keypad 53 and display 54. For multimedia support, media specific peripheral devices such as camera 55, microphone 56 and speaker 57 are connected respectively to DSP 49 and GPP 48 through analog-to-digital converter 58. In accordance with the preferred embodiment, the software components IMS control and protocol component 32 and bluetooth host stack component or bluetooth-host 59 are hosted by GPP 48, where as IMS media component 33 is hosted by DSP 49. physical connections 60 shows hardware interconnection among various components. DSP bridge 46 which interconnects GPP 48 and DSP 49, provide media streaming support.

IMS accessory 47 can be used uniquely in two different ways with cellular phones to provide enhanced services and end-user convenience.

FIG. 6 shows the first option. This figure shows the connection between the terminal equipment 61 and the mobile termination cellular phone 62 acting as a data modem. The TE can be Personal computer (PC) 63 or Personal digital assistant (PDA) 64. Using this configuration, different type of TEs such as PC 63 or PDA 64 can establish data connections with remote end points. IMS accessory 47 functions as another TE device and uses cellular phone 62 as data modem to access IMS server in order to support IMS services. In accordance with preferred embodiment, short distance radio technology bluetooth is used as communication link between IMS accessory 47 and cellular phone 62. This scheme yields several benefits as described below:

a) This scheme allows IMS accessory 47 to interoperate with any type of cellular phone 62 with bluetooth support. It is expected that majority of cellular phones will support bluetooth and hence IMS service capabilities can be extended to wide range of phones including low end phones 36 and middle range phones 40.

b) Using bluetooth offers inexpensive communication option, with minimal power consumption and interference with other short range radio technologies. This enables IMS accessory 47 and cellular phone 62 to be inexpensive and compact.

c) This scheme does not call for any modifications to cellular phone 62, thereby eliminates costly re-engineering of cellular phone 62.

FIG. 7 shows the second option with various accessories available for cellular phone 65 to provide added user convenience. Cellular phone accessories such as headset accessory 66, speaker accessory 67, camera accessory 68, display accessory 69 and keypad accessory 70, are used along with cellular phone 65 to overcome specific limitation like larger keypad than the existing ones or provide new hardware features like camera. IMS accessory 47 which functions as TE offering IMS services, also functions as IMS headset accessory 71, IMS keypad accessory 72, IMS speaker accessory 73, IMS camera accessory 74, IMS badge accessory 75 and button accessory 76.

Following paragraphs describe the invention IMS accessory 47, as shown in the FIG. 5, in detail. First, operational aspects of IMS accessory 47 as IMS client 31 are described, and then operational aspects as cellular phone accessory are described.

As shown in prior art FIG. 1, IMS client 31 consists mainly of two software components, namely IMS control protocol components referred as IMS control 32 and IMS media components referred as IMS media 33. In accordance with preferred embodiment, as shown in FIG. 5, IMS accessory 47 hosts IMS control 32 in GPP 48 and IMS media 33 in DSP 49. IMS accessory 47 addresses all the shortcomings of prior art low end phones 36 and middle range phones 40 for supporting IMS client 31.

a) Suitable GPP 48, RAM 52, ROM 51 are available in IMS accessory 47 to ensure sufficient processing and memory resources are made available to fully support IMS control 32.

b) Developing and porting IMS control 32 is limited to the processor architecture dictated by GPP 48. This greatly simplifies developing and porting complexities involved in porting to different processor architectures which is mandatory if IMS client 31 is ported to low end phones 36 and middle range phones 40. Issues involved in porting to multiple proprietary operating systems, sixteen bit versus thirty two bit architecture, big-endian versus little-endian, lack of uniform memory management policies, uniform API support for vocoder layer, power management layer, network connection management, window system layer, are far simple to handle compared to porting IMS control 32 to various low end phones 36 and middle range phones 40.

c) DSP 49 has sufficient processing and memory resources to support IMS media 33. This is because, unlike prior art low end phones 36 and middle range phones 40, DSP 49 is not burdened with 2.5 G cellular packet switching protocol stack such as GPRS.

d) IMS accessory 47 includes DSP bridge 46, which enables support for streaming media APIs for IMS control 32. This is a mandatory requirement for supporting real time IMS services.

Thus, as far as supporting IMS services, IMS accessory 47 is comparable to high end phones (FIG. 4) 43, but this is achieved without the associated limitations, such as high cost, bulkiness and limited market penetration.

The following paragraph describes how IMS accessory 47 functions as cellular phone accessory.

As shown in FIG. 5, bluetooth transceiver 50, hosts short range radio interface and its baseband, whereas bluetooth-host 59, is hosted by GPP 48. Bluetooth-host 59 consists of host side stack layers as specified by bluetooth special interest group (SIG), such as logical link control and adaptation (L2CAP), link manager protocol (LMP), service discovery protocol (SDP), radio frequency communication (RF-COMM) layers. Additionally bluetooth-host 59 also includes various profiles to enable IMS accessory 47 to be used as phone accessory, namely, Hands free profile, headset profile, subscriber information module (SIM) and personal area network (PAN) profiles.

In accordance with its preferred embodiment, IMS accessory 47 can be packaged and made available in various user friendly packages, such as wearable-over-the-ear headset, wearable pen shaped device and wearable as a badge or a clip.

Remainder of this section explains prior art FIGS. 1, 2, 3 and 4 in more details.

FIG. 1 shows the prior art IMS client 31, which is grouped into two functional components, namely IMS client control and protocol components or IMS control 32 and IMS client media components or IMS media 33. IMS control 32 is typically hosted by general purpose processor (GPP) 34 and IMS media 33 is hosted by digital signal processor (DSP) 35. IMS control 32 includes various protocol modules that are needed to implement real time interactive multimedia services, such as session initiation protocol (SIP), real time protocol/real time control protocol (RTP/RTCP), Hypertext transport protocol (HTTP), signal compressor (SIGCOMP), authorization/authentication/access control (AAA), real time streaming protocol (RTSP), session description protocol (SDP), transport control protocol (TCP), user datagram protocol (UDP), internet protocol (IP) along with IMS service logic. IMS media 33 includes adaptive multiple rate (AMR) vocoder, MPEG4 encoder/decoder, motion JPEG encoder/decoder and MP3 decoder.

Figure 2:
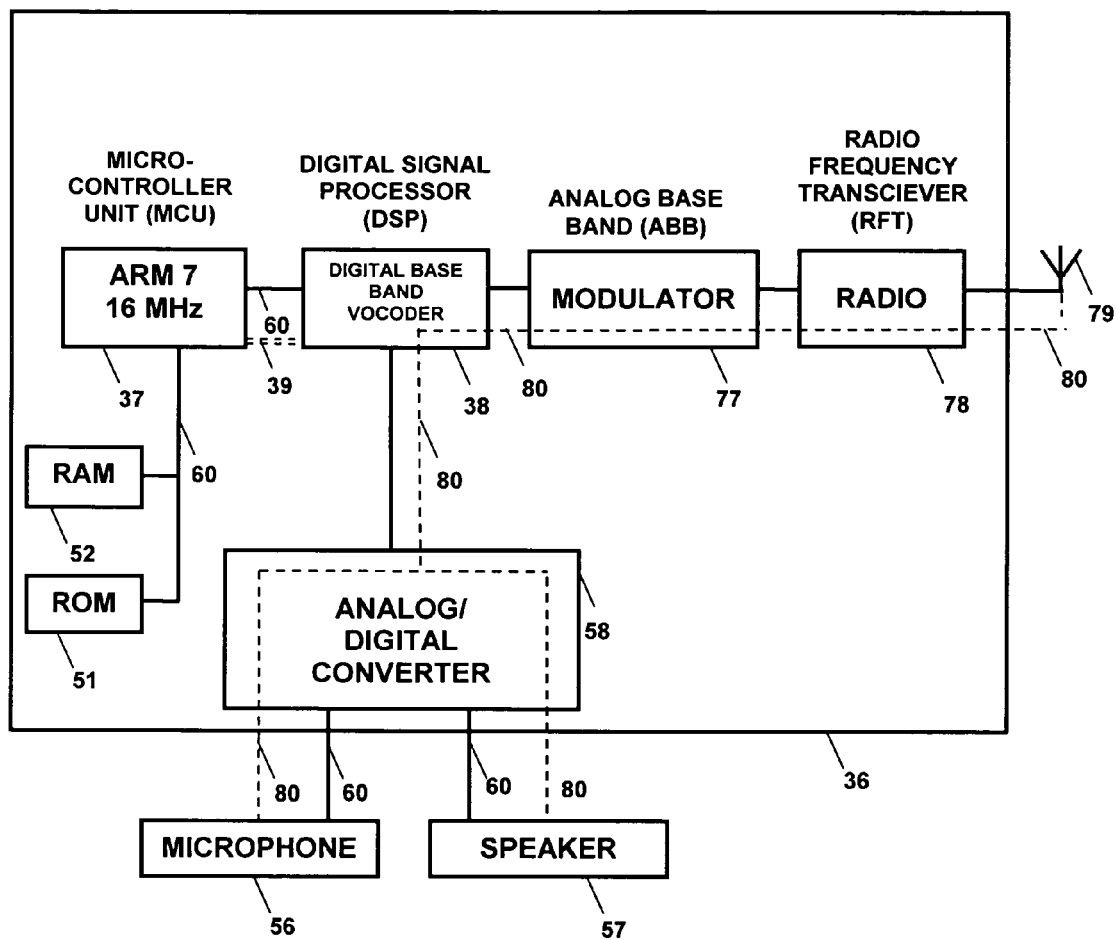
FIG. 2 shows functional architecture of prior art low end phone.

FIG. 2 shows a prior art low end phone 36 functional architecture. Low end phone 36 contains MCU 37 with RAM 52 and ROM 51, digital signal processor (DSP) 38 hosts digital baseband and vocoder modules. analog baseband 77, radio frequency transceiver 78 and antenna 79 provide necessary cellular network connectivity. Microphone 56 and speaker 57 are connected to DSP 38 though analog-to-digital converter 58. Physical connections among various components are indicated by 60. The voice flow 80 shows path taken by voice data. Control flow 39 shows path taken by call control and non-real time data.

Figure 3:
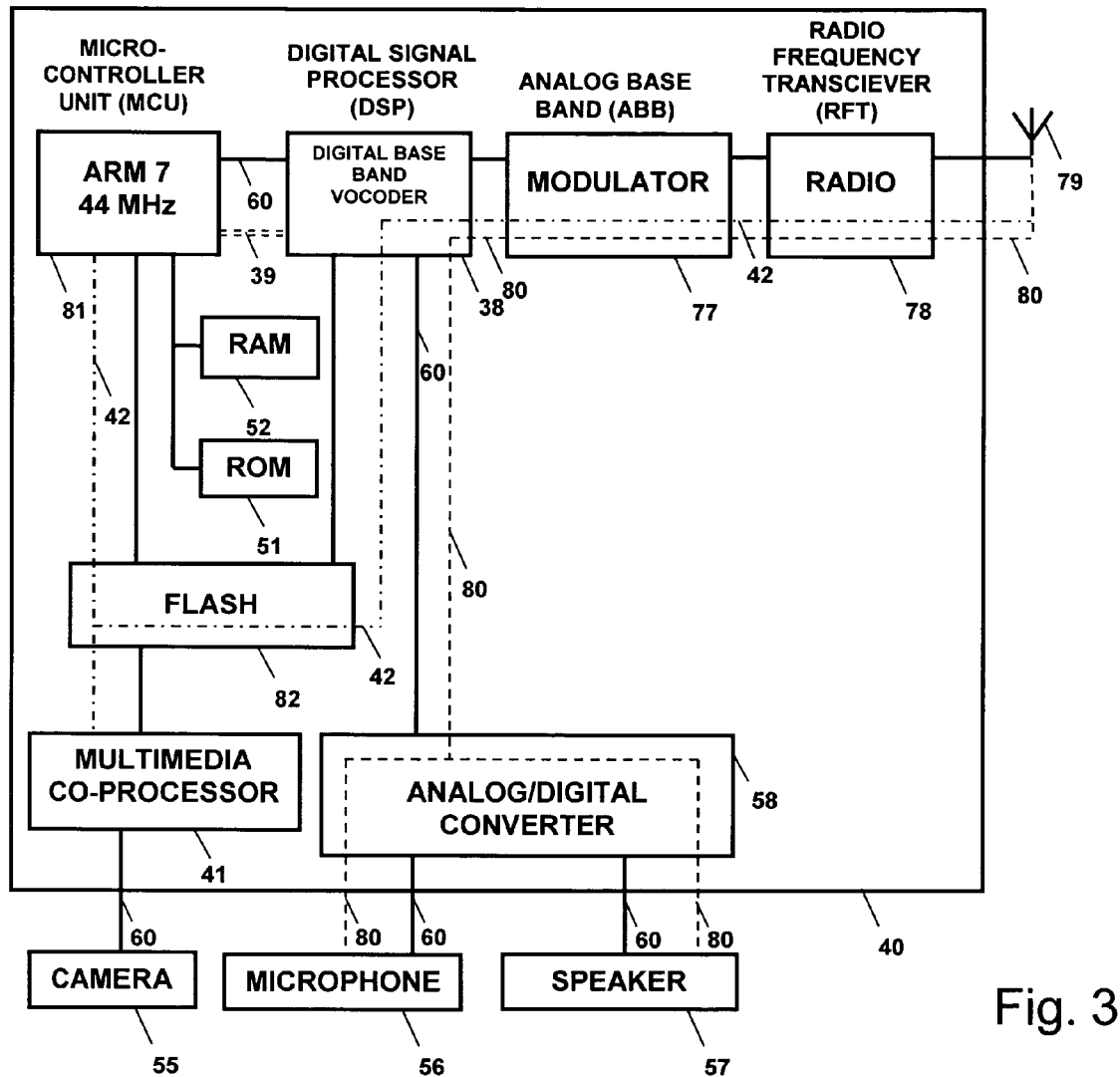
FIG. 3 shows functional architecture of prior art middle range phone.

FIG. 3 shows functional architecture of middle range phone 40. Except for few differences that are described below, middle range phone 40 shares several identical components with low end phone 36. microcontroller unit MCU 81 has increased processing power to handle additional resources needs of multimedia messaging, multimedia coprocessor 41 to run video and/or image compression, camera interface 55, flash 82 to store images and/or video and support for multimedia data flow 42. It is important to note that multimedia data flow 42 does not support real time streaming which is needed for supporting real time interactive multimedia services.

Figure 4:
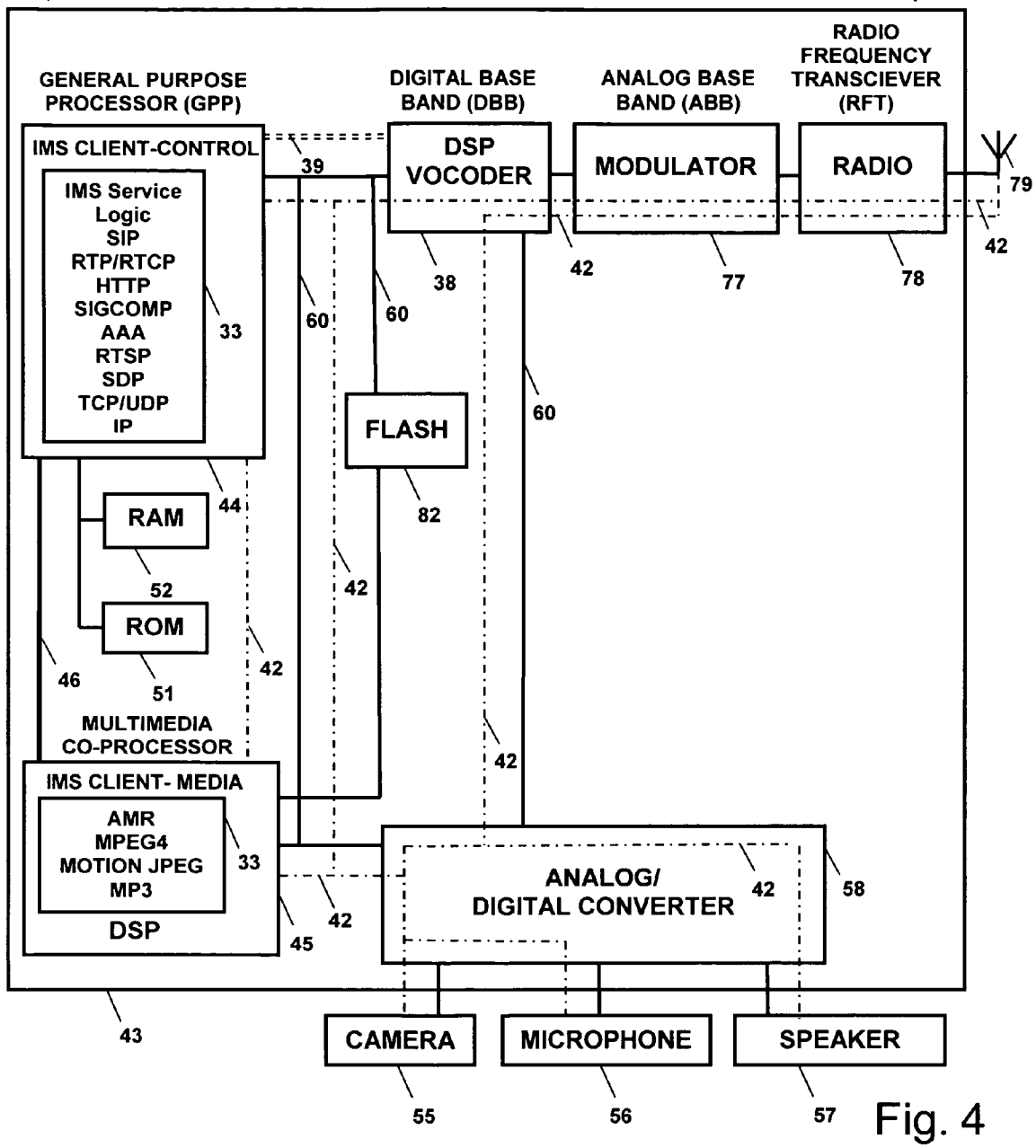
FIG. 4 shows functional architecture of prior art high end phone.

FIG. 4 shows the functional architecture for high end phone 43. Apart from few differences highlighted below, high end phone 43 shares identical components with middle range phone 40. General purpose processor (GPP) 44 and multimedia coprocessor 45 have higher processing power than its middle range phone counterparts. GPP-DSP bridge or. DSP bridge 46 provides high performance streaming support for multimedia data and hence multimedia flow 42 supports real time multimedia data flow. Due to these differences, high end phones can support real time interactive multimedia services. As shown in FIG. 4, IMS client 31 components such as IMS control 32 and IMS media 33 are hosted respectively by GPP 44 and multimedia coprocessor 45.

ALTERNATIVE EMBODIMENTS

Alternative short range radio technology such as wireless local area network—IEEE 802.11 can be used instead of bluetooth in IMS accessory 47 to produce alternate embodiment.

IMS accessory 47 can be packaged in various form factors based on prevailing market needs and customer taste.

IMS accessory 47 can also be built without DSP 49 and instead GPP 48 can be built with sufficient processing and memory resources to host IMS media 33. This decision is primarily driven by type of multimedia applications, types of general purpose processor availability and associated cost factors.

ADVANTAGES

From the description above a number of advantages of said IMS accessory device become evident:
a) A cellular phone accessory device is provided that enables delivering new real time interactive applications to low end and middle range cellular phones.
b) New real time interactive multimedia applications are delivered without having to re-engineer chipsets and architectures in low end and middle range phones.
c) A single programming environment is provided for real time interactive multimedia applications development to eliminate portability problems.
d) Access to digital signal processing functionality in said IMS accessory device is provided to enable real time interactive multimedia applications that would otherwise require expensive chipset and architecture upgrades.
e) New real time interactive multimedia applications are provided in a small form factor without impacting size and battery requirements of low end and middle range cellular phones.

CONCLUSION, RAMIFICATIONS AND SCOPE

Accordingly, the reader will see that combining an IMS client with a cellular phone accessory device provides real time interactive multimedia programmability, portability, usability, cost effectiveness and mass market appeal to deliver new real time interactive multimedia applications to end user.

Although the description above contains much specificity, these should not be construed as limiting the scope of invention but merely as providing illustrations of some of the presently preferred embodiments of this invention. Thus the scope of this invention should be determined by appended claims and their legal equivalents, rather than by example given.

We claim:
1. A cellular phone accessory device that is controlled by a cellular phone and uses said cellular phone for cellular wireless network access, said device comprising:
   a) Accessory functionality;
   b) Internet protocol multimedia subsystem client software;
   c) Portable power source to operate said cellular phone accessory device;
   d) Vocoder software to encode and decode voice bits generated for said internet protocol multimedia subsystem client software;
   e) Multimedia encode and decode chipsets required by said internet protocol multimedia subsystem client software and said accessory functionality;
   f) General purpose processor required by said internet protocol multimedia subsystem client software and said accessory functionality;
   g) Multimedia interconnects between said multimedia chipsets and said general purpose processor;
   h) Multimedia interconnects between said cellular phone accessory device and said cellular phone;
   i) Input and output system;
   j) Multimedia capture system; and
   k) Multimedia display system.
2. The cellular phone accessory device that is controlled by a cellular phone of claim 1, further comprising:
   a) Image processor software to encode and decode image bits for said internet protocol multimedia subsystem client software; and
   b) Motion image processor software to encode and decode moving image bits for said internet protocol multimedia subsystem client software.
3. The cellular phone accessory device of claim 1, wherein said accessory functionality is provided by accessories selected from group consisting of speaker, headset, car adapter, caller identifier, timer, music player, personal digital assistant, display, camera, microphone, keyboard, glucose meter, health check meter, scanner, and printer.
4. The cellular phone accessory device of claim 1, wherein said vocoder software is selected from group consisting of adaptive multiple rate vocoder, global system for mobile full rate vocoder, global system for mobile half rate vocoder, enhanced variable rate codec, harmonic vector excitation codec, pulse code modulation based vocoder, adaptive differential pulse code modulation based vocoder, code excited linear pulse based vocoder, and open source ogg vorbis speex vocoder.
5. The cellular phone accessory device of claim 1, wherein said multimedia encode and decode chipsets are selected from group consisting of digital signal processor, general purpose processor extended with signal processing capabilities, field programmable gate array, complex programmable logic device, application specific integrated circuit, and programmable processor.
6. The cellular phone accessory device of claim 1, wherein said general purpose processor is selected from group consisting of eight bit processor, sixteen bit processor, thirty two bit processor, field programmable gate array, complex programmable logic device, and programmable processor.
7. The cellular phone accessory device of claim 1, wherein said multimedia interconnect between said multimedia chipsets is selected from group consisting of interchip bus, universal asynchronous receive transmit bus, serial line bus, direct memory access bus, and proprietary bus.

8. The cellular phone accessory device of claim 1, wherein said multimedia interconnect between said cellular phone accessory device, said cellular phone is selected from group consisting of serial line, bluetooth, wireless local area network, infra red, headset jack, and battery connection point.

9. The cellular phone accessory device of claim 1, wherein, said input and output system is comprised of elements selected from group consisting of keyboard, pointing device, touch sensitive display, microphone, speaker, liquid crystal display, plasma display, picture tube display, and projector based display.

10. The cellular phone accessory device of claim 1, wherein said multimedia capture system is comprised of elements that are selected from group consisting of complementary metal oxide semiconductor camera, charged coupled device camera, and microphone.

11. The cellular phone accessory device of claim 1, wherein said multimedia display system is comprised of elements that are selected from group consisting of liquid crystal display, organic light emitting diode display, plasma display, picture tube based display, projector based display, speaker, and vibration unit.

12. The cellular phone accessory device of claim 1, wherein said portable power source is made with battery technology selected from group consisting of nickel cadmium, alkaline, nickel metal hydride, lithium, lithium ion, and fuel cell.

13. The cellular phone accessory device of claim 2, wherein said image processor software processes image formats that is selected from group consisting of portable network graphics format, joint picture experts group format, and graphics interchange format.

14. The cellular phone accessory device of claim 2, wherein said motion image processor software processes moving image formats that is selected from group consisting of motion joint picture experts group format, motion picture experts group format, and H.264 video format.

* * * * *